(12) United States Patent
Yadlapalli

(10) Patent No.: US 7,348,734 B2
(45) Date of Patent: Mar. 25, 2008

(54) METHOD FOR PROTECTING A BALLAST FROM AN OUTPUT GROUND-FAULT CONDITION

(75) Inventor: Naveen Yadlapalli, Hoffman Estates, IL (US)

(73) Assignee: Osram Sylvania Inc., Danvers, MA (US)

( * ) Notice: Subject to any disclaimer, the term of this patent is extended or adjusted under 35 U.S.C. 154(b) by 11 days.

(21) Appl. No.: 11/172,086

(22) Filed: Jun. 30, 2005

(65) Prior Publication Data

US 2005/0218829 A1    Oct. 6, 2005

(51) Int. Cl.
H05B 37/02 (2006.01)
H05B 39/04 (2006.01)
H05B 41/36 (2006.01)
H02H 7/00 (2006.01)
H02H 9/00 (2006.01)

(52) U.S. Cl. .................... 315/224; 315/225; 361/18
(58) Field of Classification Search ........ 315/224–225; 361/18
See application file for complete search history.

(56) References Cited

U.S. PATENT DOCUMENTS

| | | | |
|---|---|---|---|
| 4,663,571 A | 5/1987 | Nilssen | 315/244 |
| 5,770,925 A | 6/1998 | Konopka et al. | 315/225 |
| 5,939,836 A | 8/1999 | Mita et al. | 315/224 |
| 5,969,483 A * | 10/1999 | Li et al. | 315/225 |
| 6,051,940 A | 4/2000 | Arun | |
| 6,181,079 B1 * | 1/2001 | Chang et al. | 315/247 |
| 6,291,944 B1 | 9/2001 | Hesterman et al. | 315/224 |
| 6,657,400 B2 * | 12/2003 | Konopka et al. | 315/224 |
| 6,768,274 B2 * | 7/2004 | Konopka et al. | 315/291 |
| 6,943,503 B2 * | 9/2005 | Ozasa et al. | 315/224 |
| 2003/0062848 A1 * | 4/2003 | Prasad | 315/224 |
| 2003/0062850 A1 | 4/2003 | Konopka et al. | |
| 2006/0087259 A1 * | 4/2006 | Fiorello | 315/291 |

FOREIGN PATENT DOCUMENTS

| | | |
|---|---|---|
| EP | 1 067 827 A2 | 1/2001 |
| EP | 1 740 023 A2 | 1/2007 |
| WO | 99/32953 | 7/1999 |

OTHER PUBLICATIONS

European Search Report, Application No. EP 06 01 3142, dated Jul. 18, 2007, 3 pgs.

* cited by examiner

Primary Examiner—Michael Sherry
Assistant Examiner—Dharti H Patel
(74) Attorney, Agent, or Firm—Carlo S. Bessone

(57) ABSTRACT

A method (700) for protecting a ballast from an output ground-fault condition includes the steps of applying power to the ballast (step 710), providing a startup delay period for a DC-to-DC converter (step 730), monitoring a voltage across a DC blocking capacitor (step 740), preventing startup of the DC-to-DC converter in response to the voltage across the DC blocking capacitor being greater than a threshold value during the startup delay period (step 750), and allowing startup of the DC-to-DC converter in response to the voltage across the DC blocking capacitor being less than the threshold value throughout the startup delay period (step 760). Preferably, the steps of monitoring (step 740), preventing (step 750), and allowing (step 760) are implemented by a microcontroller, and the DC-to-DC converter is preferably implemented as either a Sepic converter or a buck converter.

14 Claims, 4 Drawing Sheets

US 7,348,734 B2

METHOD FOR PROTECTING A BALLAST FROM AN OUTPUT GROUND-FAULT CONDITION

FIELD OF THE INVENTION

The present invention relates to the general subject of circuits for powering discharge lamps. More particularly, the present invention relates to a method for protecting a ballast from damage in the event of an output ground-fault.

BACKGROUND OF THE INVENTION

A number of existing electronic ballasts have non-isolated outputs. Such ballasts typically include circuitry for protecting the ballast inverter from damage in the event of a lamp fault condition (e.g., removal or failure of a lamp).

Occasionally, the output wiring of a ballast [i.e., the wires that connect the ballast to the lamp(s)] becomes shorted to earth ground via the lighting fixture. Such a condition can arise, for example, due to the output wires becoming loose or pinched. For ballasts with non-isolated outputs, if the inverter begins to operate while an earth ground short is present at one or more of the output wires, a large low frequency (e.g., 60 hertz) current may flow through the inverter transistors and cause them to fail.

U.S. Pat. No. 6,657,400 B2 (entitled "Ballast with Protection Circuit for Preventing Inverter Startup During an Output Ground-Fault Condition" and assigned to the same assignee as the present invention) discloses a ballast that includes an output ground-fault protection circuit. The ground-fault protection circuit that is disclosed in the U.S. Pat. No. 6,657,400 is well suited for many ballasts, but has the drawback of requiring additional discrete circuitry in order to provide output ground-fault protection.

In recent years, it has become increasingly common for electronic ballasts to include a programmable microcontroller that coordinates and controls multiple functions (e.g., lamp fault protection) within the ballast. For such ballasts, a need exists for a ground-fault protection approach that can be realized with little or no additional circuitry. A ballast that includes such a ground-fault protection approach would represent a significant advance over the prior art.

DETAILED DESCRIPTION OF THE PREFERRED EMBODIMENTS

Figure 1:
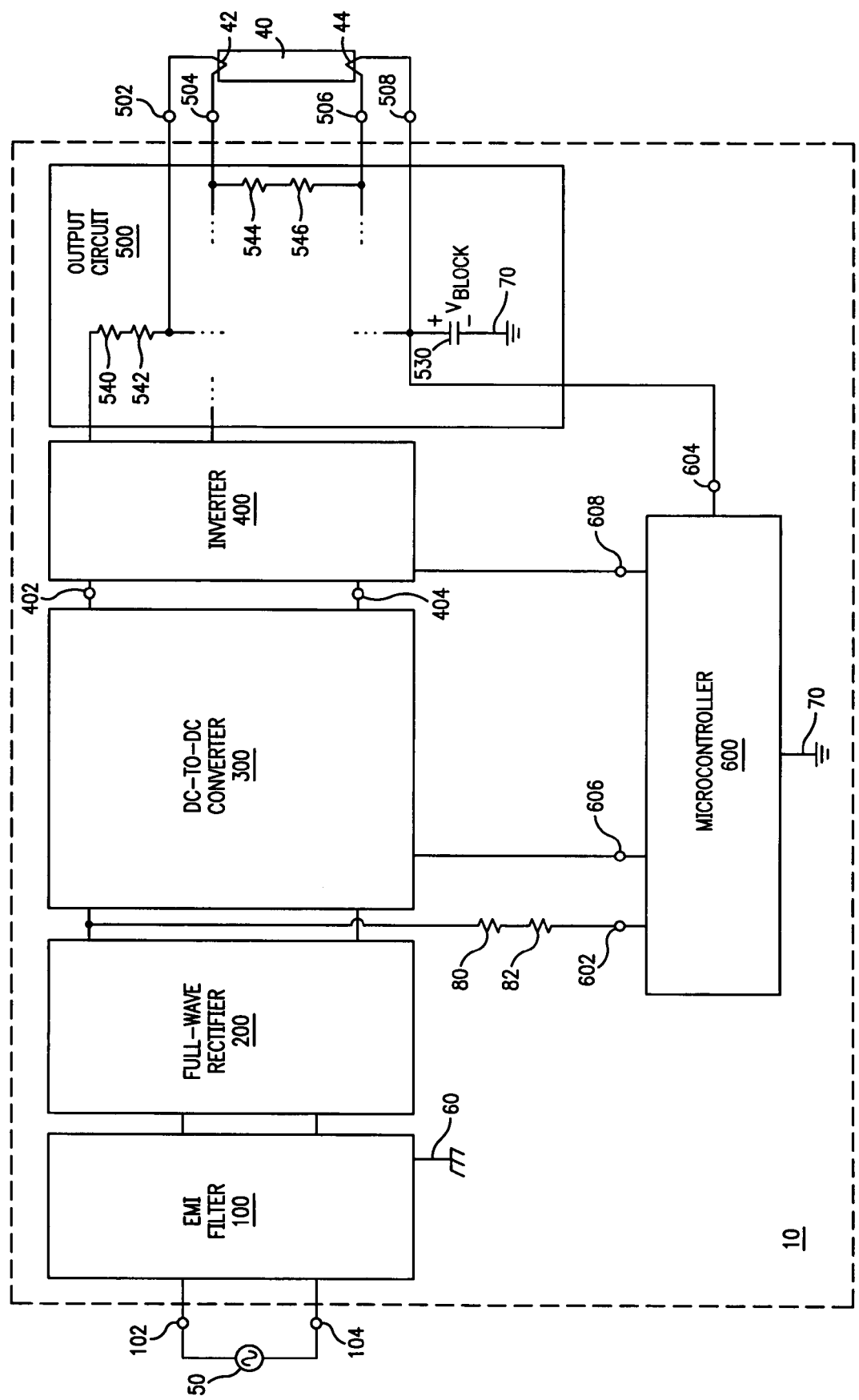
FIG. 1 is a block diagram schematic of a ballast with output ground-fault protection, in accordance with the preferred embodiments of the present invention.

FIG. 1 describes a ballast 10 for powering at least one gas discharge lamp 40. Ballast 10 comprises an EMI filter 100, a full-wave rectifier 200, a DC-to-DC converter 300, an inverter 400, an output circuit 500, and a microcontroller 600.

EMI filter 100 includes input terminals 102,104 adapted to receive a conventional source of alternating current (AC) voltage 50, such as 120 volts rms at 60 hertz. Full-wave rectifier 200 is coupled to EMI filter 100. DC-to-DC converter 300 is coupled to full-wave rectifier 200. Inverter 400 is coupled to DC-to-DC converter 300. Output circuit 500 is coupled to inverter 400, and includes output terminals 502,504,506,508 adapted for connection to gas discharge lamp 40. Microcontroller 600 is coupled to DC-to-DC converter 300, inverter 400, and output circuit 500.

During operation, DC-to-DC converter 300 receives a full-wave rectified voltage from full-wave rectifier 200 and provides a substantially direct current (DC) output voltage to inverter 400 via terminals 402,404. DC-to-DC converter 300 has a non-operating mode (during which the DC output voltage is substantially zero, which occurs prior to startup of the DC-to-DC converter) and an operating mode (during which the DC output voltage is substantially greater than zero, which occurs after startup of the DC-to-DC converter). In response to an output ground-fault condition wherein at least one of output terminals 502,504,506,508 is shorted to earth ground, microcontroller 600 directs DC-to-DC converter 300 to remain in the non-operating mode. By forcing DC-to-DC converter 300 to remain in the non-operating mode if an output ground-fault condition is present, microcontroller 600 protects inverter 400 from damage that would otherwise occur. Preferably, microcontroller 600 is realized by an integrated circuit (IC), such as a ST7LITE1B microcontroller IC manufactured by ST Microelectronics, along with associated peripheral circuitry.

Figure 2:
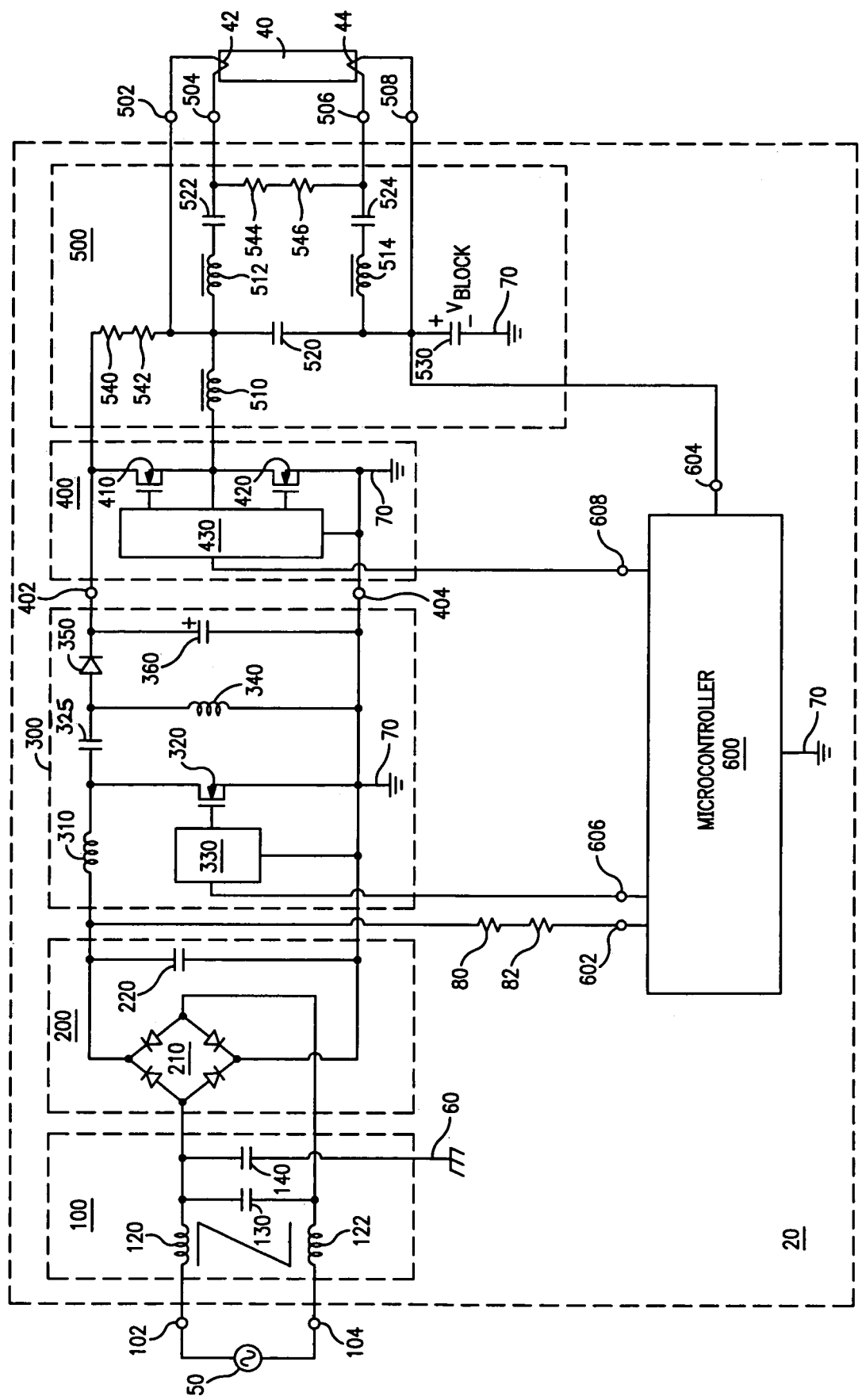
FIG. 2 is a detailed electrical schematic of a ballast with output ground-fault protection, in accordance with a first preferred embodiment of the present invention.

Turning now to FIG. 2, in a first preferred embodiment of the present invention, ballast 20 includes a DC-to-DC converter 300 that is implemented as a Sepic converter. Sepic converter 300 comprises a first inductor 310, an electronic switch 320 (preferably implemented as a N-channel field effect transistor), a first capacitor 325, a drive circuit 330, a second inductor 340, a diode 350, and a second capacitor 360. Further details regarding the construction and theory of operation of Sepic converter 300 are well known to those skilled in the art of power supplies and electronic ballasts, and thus will not be further elaborated upon herein. Nevertheless, for purposes of understanding the present invention, it is important to appreciate that, while in the non-operating mode (i.e., during which time drive circuit 325 does not commutate electronic switch 320), the output voltage (provided between terminals 402,404) of Sepic converter 300 is approximately zero. When an output ground-fault condition is detected following application of power to ballast 20, microcontroller 600 directs Sepic converter 300 to remain in the non-operating mode, thereby ensuring that substantially zero voltage is supplied to inverter 400. This protects inverter 400 from the damage that would otherwise occur due to presence of a ground-fault at any of output terminals 502,504,506,508.

As described in FIG. 2, EMI filter 100 includes magnetically coupled inductors 120,122, an X-capacitor 130, and a Y-capacitor 140 having one end that is coupled to earth ground 60. Full-wave rectifier 200 includes a diode bridge 210 and a capacitor 220. Inverter 400 is preferably implemented as a half-bridge type inverter that includes first and second inverter switches 410,420 (preferably realized by N-channel field-effect transistors) and an inverter drive circuit 430 that provides substantially complementary commutation of inverter switches 410,420. Output circuit 500 is preferably implemented as a series resonant type output circuit comprising first, second, third, and fourth output terminals 502,504,506,508, a resonant inductor 510, a resonant capacitor 520, a direct current (DC) blocking capacitor 530, a first filament heating circuit comprising a first winding 512 (preferably, first winding 512 is magnetically coupled to resonant inductor 510) and a first capacitor 522, a second filament heating circuit comprising a second winding 514 (preferably, second winding 514 is magnetically coupled to resonant inductor 510) and a second capacitor 524, and filament path resistors 540,542,544,546. First and second output terminals 502,504 are adapted for connection to a first filament 42 of lamp 40. Third and fourth output terminals 506,508 are adapted for connection to a second filament of lamp 40. DC blocking capacitor 530 is coupled between fourth output terminal 508 and circuit ground 70.

As known to those skilled in the art of power supplies and electronic ballasts, output circuit 500 may be modified in certain well-known ways (which differ from that which is described in FIG. 2) without substantially affecting the desired operation of ballast 20. For example, the lower end of resonant capacitor 520 may alternatively be coupled directly to circuit ground 70 (instead of being coupled to fourth output terminal 508 and the top of DC blocking capacitor 530). As a further example, capacitors 522,524 in the first and second filament heating circuits may be replaced with diodes. Various other modifications to output circuit 500 will be apparent to those skilled in the art of power supplies and electronic ballasts.

Referring again to FIG. 2, microcontroller 600 includes a startup input 602, a detection input 604, a first control output 606, and a second control output 608. It should be appreciated that, in an actual ballast, microcontroller 600 will include additional inputs and outputs (for the sake of clarity, those inputs and outputs are not shown or described herein) for implementing other ballast control functions, such as lamp fault protection, control of lamp current or power, and so forth. As described in FIG. 2, startup input 602 is coupled to the output of full-wave rectifier 200 via resistors 80,82. During operation, startup input 602 receives voltage/current necessary for operating microcontroller 600. Detection input 604 is coupled to DC blocking capacitor 530 and fourth output terminal 508. During operation, detection input 604 allows microcontroller 600 to monitor a voltage, $V_{BLOCK}$, across DC blocking capacitor 530. The magnitude of $V_{BLOCK}$ prior to startup of Sepic converter 300 indicates whether or not an output ground-fault condition is present. More specifically, if a voltage that is greater than a predetermined threshold value (e.g., 100 millivolts) is present at detection input 604 prior to startup of Sepic converter 300, then an output ground-fault condition is deemed to be present; in response, microcontroller 600 directs Sepic converter 300 to remain in the non-operating mode. In this way, microcontroller protects inverter 400 from being damaged when an output ground-fault is present. Conversely, if a voltage that is less than the predetermined threshold value (e.g., 100 millivolts) is present at detection input 604 throughout the period prior to startup of Sepic converter 300, then an output ground-fault condition is deemed to not be present; in response, microcontroller 600 allows Sepic converter 300 to enter the operating mode.

For practical reasons, it is preferred that the predetermined threshold value be a small nonzero voltage that is on the order of about 100 millivolts or so. This is desirable in order to provide some degree of immunity to possible electrical noise (that might otherwise falsely indicate an output ground-fault condition).

The detailed operation of ballast 20 is now explained with reference to FIG. 2 as follows.

During normal operation, when no output ground-fault is present, ballast 20 operates in the following manner. When power is initially applied to ballast 20 (at t=0), DC-to-DC converter 300, inverter 400, and microcontroller 600 are initially off. Within a short period of time following initial application of power to ballast 20, microcontroller 600 turns on due to the voltage provided to startup input 602. At that point, DC-to-DC converter 300 and inverter 400 are still off. DC-to-DC converter 300 will remain off (i.e., in the non-operating mode) for a predetermined startup delay period (i.e., $0<t<t_1$). With microcontroller 600 turned on, microcontroller 600 monitors (via detection input 604) the voltage, $V_{BLOCK}$, across DC blocking capacitor 530. Because no output ground-fault is present, and because both DC-to-DC converter 300 and inverter 400 are not yet operating, $V_{BLOCK}$ will be approximately zero during this time. Accordingly, at the end of the predetermined startup delay period (i.e., $t=t_1$), microcontroller 600 will allow DC-to-DC converter 300 to start in a normal manner, at which point DC-to-DC converter 300 will provide a nonzero output voltage between terminals 402,404. Inverter 400 subsequently starts and proceeds to provide, via output circuit 500, voltages for preheating lamp filaments 42,44, a high voltage for igniting lamp 40, and a magnitude-limited current for operating lamp 40 after ignition.

If, on the other hand, an output ground-fault condition is present (i.e., at least one of output terminals 502,504,506, 508 is shorted to earth ground), ballast 20 operates in the following manner. When power is initially applied to ballast 20 (at t=0), DC-to-DC converter 300, inverter 400, and microcontroller 600 are initially off. Within a short period of time following initial application of power to ballast 20, microcontroller 600 turns on due to the voltage provided to startup input 602. At that point, DC-to-DC converter 300 and inverter 400 are still off. DC-to-DC converter 300 will remain off; (i.e., in the non-operating mode) for a predetermined startup delay period (i.e., $0<t<t.sub.1$). With microcontroller 600 turned on, microcontroller 600 monitors (via detection input 604) the voltage, V.sub.BLOCK, across DC blocking capacitor 530. With an output ground-fault condition present, a low frequency (e.g., 60 hertz) current flows up from earth ground 60 to the shorted output terminal (502 or 504 or 506 or 508), through one or both lamp filaments 42,44 (depending on which output terminal is shorted to earth ground), through filament path resistors 544,546 (if the ground-fault is present at output terminal 502 or 504), through DC blocking capacitor 530, and into circuit ground 70. The resulting low frequency current that flows in the event of an output ground-fault causes a nonzero voltage that is substantially greater than a predetermined threshold value (e.g., 100 millivolts) to develop across DC blocking capacitor 530. That nonzero voltage is detected by microcontroller 600, which responds by directing Sepic converter 300 to remain off (i.e., in the non-operating mode). In this way, ballast 20 is protected from the damage (e.g., destruction of inverter transistors 410,420) that would otherwise occur due to an output ground-fault condition.

As described herein, microcontroller 600 is responsive to protect ballast 20 from a ground-fault condition at either of output terminals 502,504,506,508. However, it should be appreciated that, in the absence of appropriate protection, a ground-fault at output terminal 502 or 504 would be potentially more destructive than a ground-fault at output terminal 506 or 508.

Figure 3:
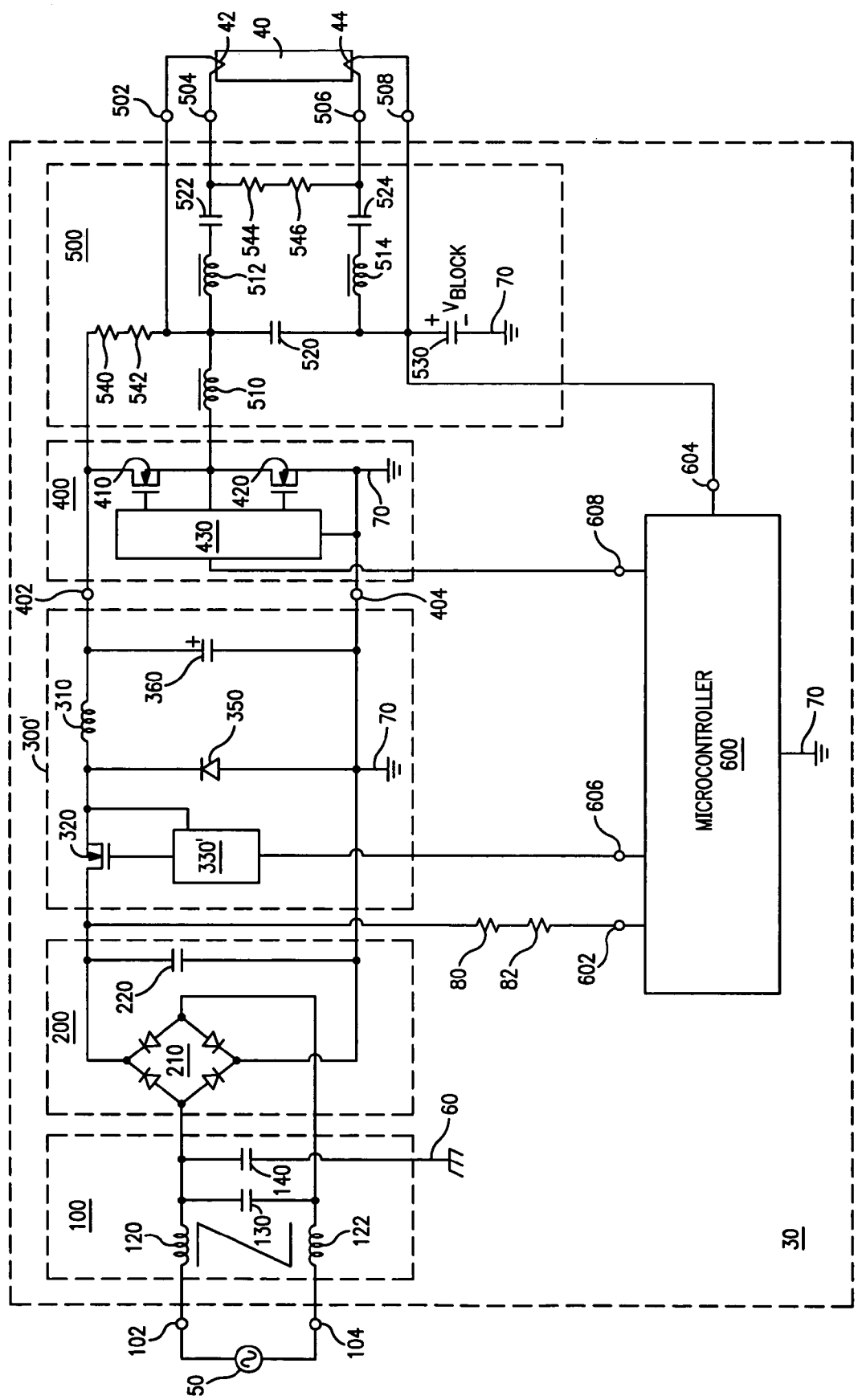
FIG. 3 is a detailed electrical schematic of a ballast with output ground-fault protection, in accordance with a second preferred embodiment of the present invention.

Turning now to FIG. 3, in a second preferred embodiment of the present invention, ballast 30 includes a DC-to-DC converter that is implemented as a buck converter 300'. Buck converter 300' comprises an inductor 310, an electronic switch 320 (preferably realized by a N-channel field-effect transistor), a drive circuit 330', a diode 350, and a capacitor 360. Details regarding the construction and theory of operation of buck converter 300' are well known to those skilled in the art of power supplies and electronic ballasts, and thus will not be further elaborated upon herein. However, for purposes of understanding the present invention, it is important to appreciate that, while in the non-operating mode (i.e., during which time drive circuit 325' does not commutate electronic switch 320), the output voltage (provided between terminals 402,404) of buck converter 300' is approximately zero. When an output ground-fault condition is detected following application of power to ballast 20, microcontroller 600 directs buck converter 300 to remain in the non-operating mode, thereby ensuring that substantially zero voltage is supplied to inverter 400. This protects inverter 400 from the damage that would otherwise occur due to the presence of a ground-fault at any of output terminals 502, 504,506,508.

In the second preferred embodiment, as described in FIG. 3, the preferred structures for EMI filter 100, full-wave rectifier 200, inverter 400, output circuit 500, and microcontroller 600 are identical to that which was previously described in connection with the first preferred embodiment (i.e., ballast 20) described in FIG. 2. Moreover, the detailed operation of ballast 30 is essentially the same as that which was previously described with reference to ballast 20 (FIG. 2).

Figure 4:
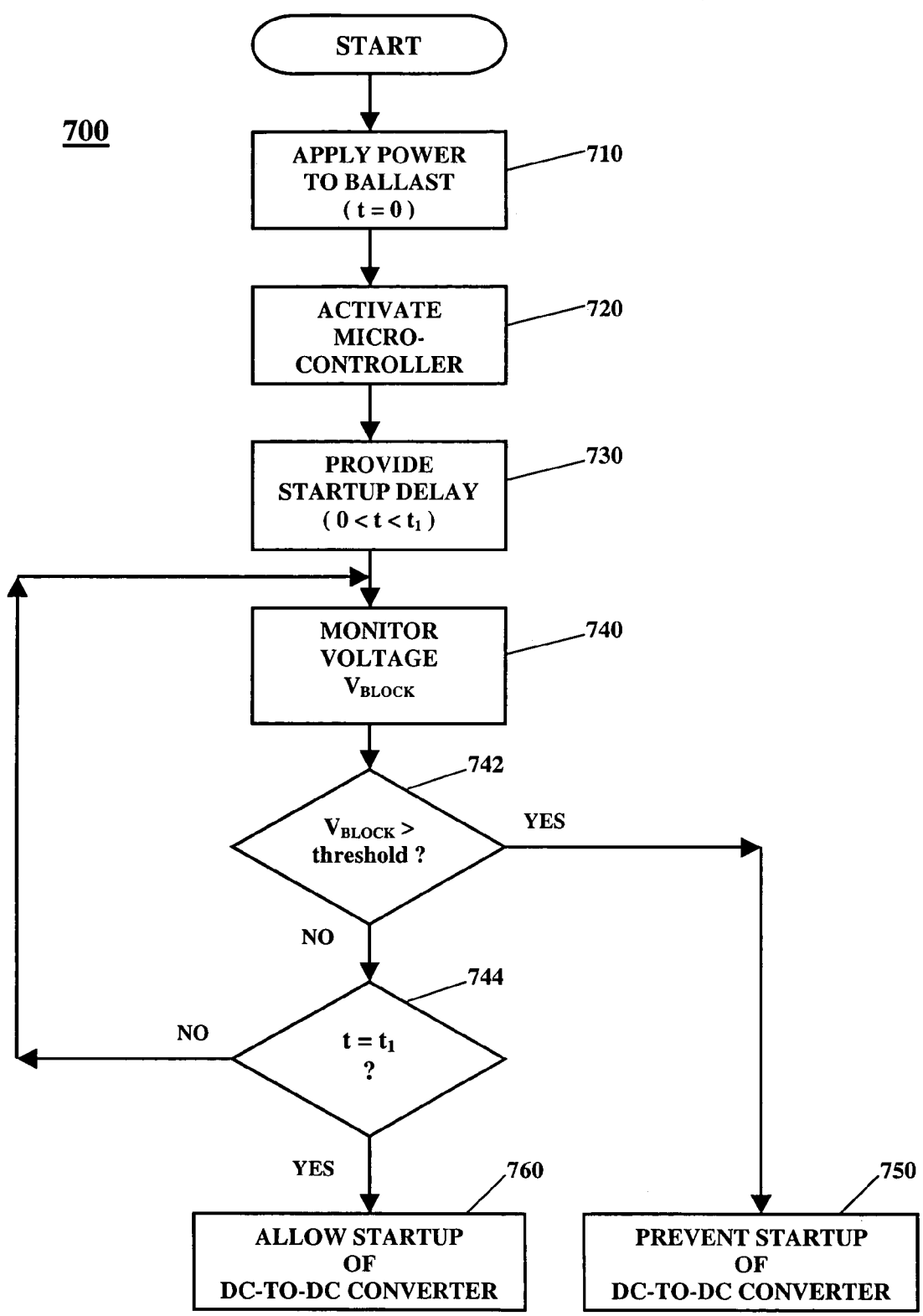
FIG. 4 is a flowchart that describes a method for protecting a ballast from an output ground-fault condition, in accordance with the preferred embodiments of the present invention.

FIG. 4 describes a method, for a ballast that includes a DC-to-DC converter and a direct current (DC) blocking capacitor, for protecting the ballast from an output ground-fault condition. The method 700 comprises the steps of: (1) applying power to the ballast (step 710); (2) activating a microcontroller (step 720); (3) providing a startup delay period ($0<t<t_1$) for the DC-to-DC converter (step 730); (4) monitoring a voltage, $V_{BLOCK}$, across the direct current (DC) blocking capacitor during the startup delay period (step 740); (4) in response to $V_{BLOCK}$ being greater than a predetermined threshold value (e.g., 100 millivolts) during the startup delay period, preventing startup of the DC-to-DC converter (decision block 742 and step 750); (5) in response to $V_{BLOCK}$ being less than the predetermined threshold value throughout the startup delay period, allowing startup of the DC-to-DC converter at $t=t_1$ (decision blocks 742,744 and step 760). In accordance with the first and second preferred embodiments described herein, the steps of monitoring (step 740), preventing (step 750), and allowing (step 760) are executed via the microcontroller, and the DC-to-DC converter is preferably implemented as either a Sepic converter or a buck converter. Moreover, it is preferred that the predetermined threshold value be a small nonzero voltage that is on the order of about 100 millivolts or so, in order to provide some degree of immunity to electrical noise.

Although the present invention has been described with reference to certain preferred embodiments, numerous modifications and variations can be made by those skilled in the art without departing from the novel spirit and scope of this invention. For example, although the present description is directed to ballasts 10,20,30 that power a single gas discharge lamp 40, the principles of the present invention are readily extended and applied to ballasts that power multiple gas discharge lamps. Additionally, the DC-to-DC converter is not limited to a Sepic or buck converter, but may be implemented by any other type of converter (e.g., a flyback converter or a buck+boost converter) that provides a substantially zero output voltage prior to startup.

What is claimed is:

1. A method for protecting a ballast from an output ground-fault condition, the method comprising the steps of:
    applying power to the ballast;
    providing a startup delay period for a DC-to-DC converter;
    monitoring a voltage across a direct current (DC) blocking capacitor, wherein the DC blocking capacitor is operably coupled in series with the at least one gas discharge lamp;
    preventing startup of the DC-to-DC converter, in response to the voltage across the DC blocking capacitor being greater than a predetermined threshold value during the startup delay period; and
    allowing startup of the DC-to-DC converter, in response to the voltage across the DC blocking capacitor being less than the predetermined threshold value throughout the startup delay period.

2. The method of claim 1, further comprising the step of activating a microcontroller, wherein the step of activating the microcontroller is executed between the steps of applying power to the ballast and providing a startup delay period for a DC-to-DC converter.

3. The method of claim 2, wherein the step of monitoring a voltage across a DC blocking capacitor is executed via the microcontroller.

4. The method of claim 3, wherein the steps of preventing startup of the DC-to-DC converter and allowing startup of the DC-to-DC converter are executed via the microcontroller.

5. The method of claim 1, wherein the DC-to-DC converter is one of: (i) a Sepic converter; and (ii) a buck converter.

6. The method of claim 1, wherein the predetermined threshold value is on the order of about 100 millivolts.

7. A method for protecting a ballast for powering at least one gas discharge lamp from an output ground-fault condition, the method comprising the steps of:
    applying power to the ballast;
    activating a microcontroller;
    providing a startup delay period for a Sepic converter;
    monitoring a voltage across a direct current (DC) blocking capacitor that is operably coupled in series with the at least one gas discharge lamp;
    preventing startup of the Sepic converter, in response to the voltage across the DC blocking capacitor being greater than a predetermined threshold value during the startup delay period; and
    allowing startup of the Sepic converter, in response to the voltage across the DC blocking capacitor being less than a predetermined threshold value throughout the startup delay period.

8. The method of claim 7, wherein the step of monitoring a voltage across a DC blocking capacitor is executed via the microcontroller.

9. The method of claim 8, wherein the steps of preventing startup of the Sepic converter and allowing startup of the Sepic converter are executed via the microcontroller.

10. The method of claim 7, wherein the predetermined threshold value is on the order of about 100 millivolts.

11. A method for protecting a ballast for powering at least one gas discharge lamp from an output ground-fault condition, the method comprising the steps of:
applying power to the ballast;
activating a microcontroller;
providing a startup delay period for a buck converter;
monitoring a voltage across a direct current (DC) blocking capacitor that is operatively coupled in series with the at least one gas discharge lamp;
preventing startup of the buck converter, in response to the voltage across the DC blocking capacitor being greater than a predetermined threshold value during the startup delay period; and
allowing startup of the buck converter, in response to the voltage across the DC blocking capacitor being less than the predetermined threshold value throughout the startup delay period.

12. The method of claim 11, wherein the step of monitoring a voltage across a DC blocking capacitor is executed via the microcontroller.

13. The method of claim 12, wherein the steps of preventing startup of the buck converter and allowing startup of the buck converter are executed via the microcontroller.

14. The method of claim 11, wherein the predetermined threshold value is on the order of about 100 millivolts.

* * * * *